March 26, 1968 P. SCHIERSE ET AL 3,374,725
VALVE FOR AIR RAID SHELTERS

Original Filed Jan. 27, 1965 7 Sheets-Sheet 1

INVENTORS
Paul Schierse
Günter Franke

BY Bailey, Stephens and Huettig
ATTORNEYS

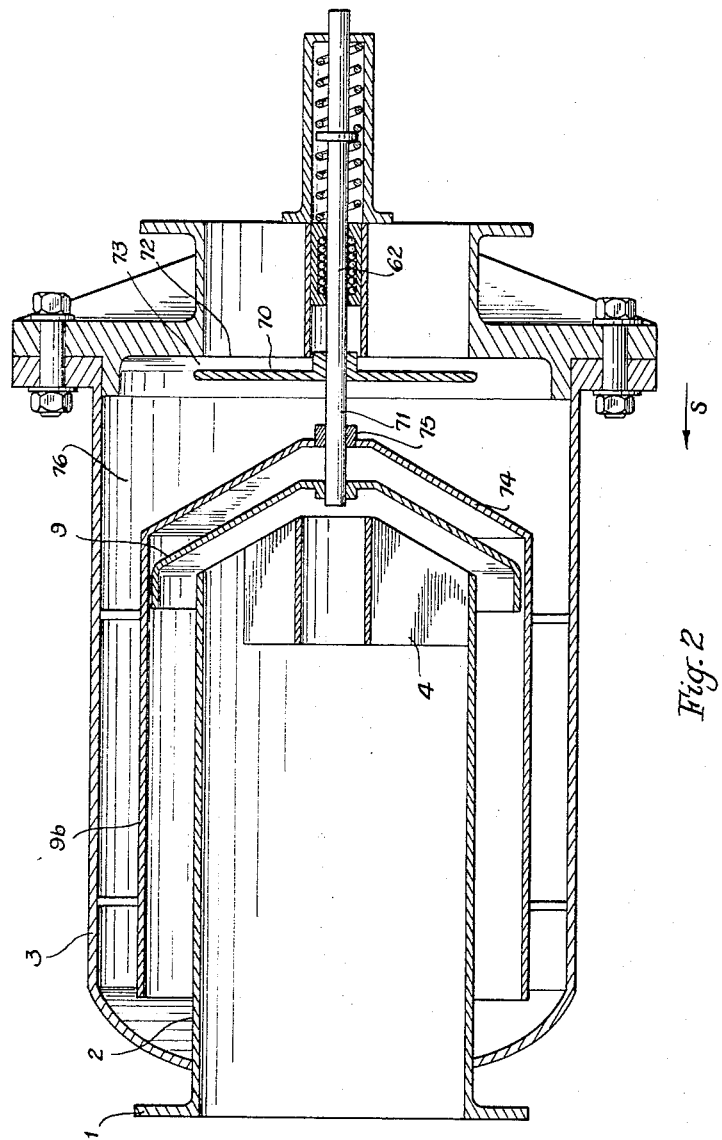

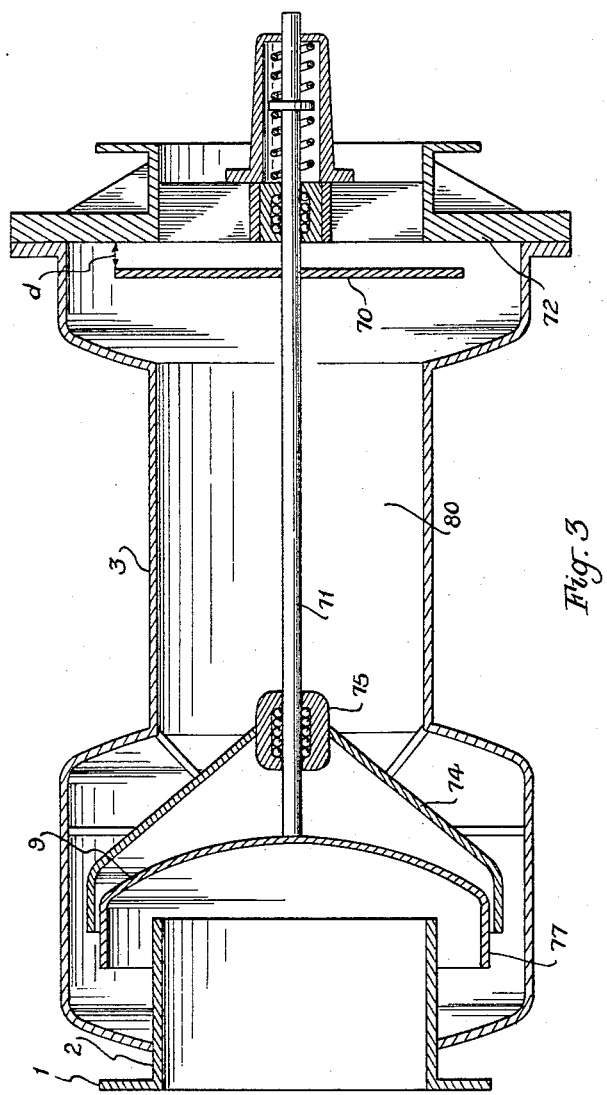

March 26, 1968   P. SCHIERSE ETAL   3,374,725
VALVE FOR AIR RAID SHELTERS
Original Filed Jan. 27, 1965   7 Sheets-Sheet 4
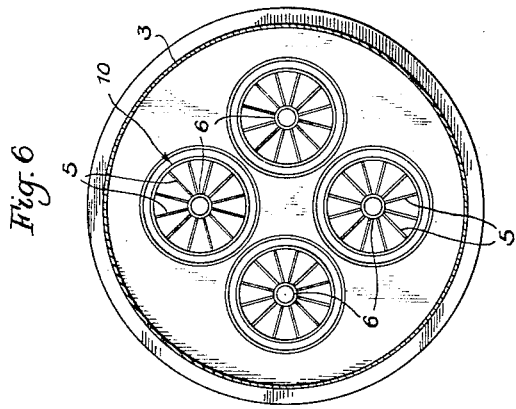
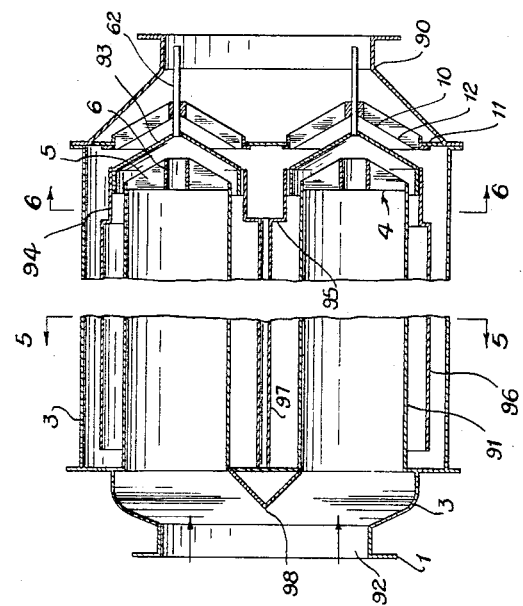
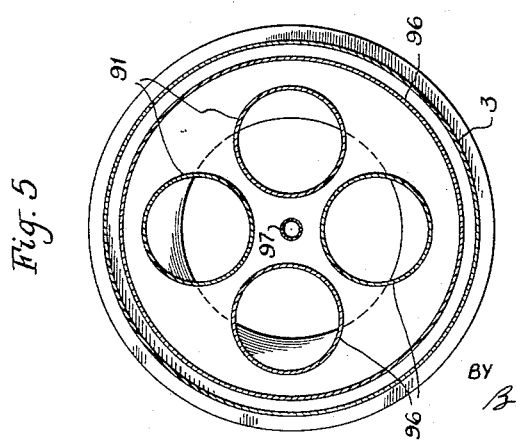
INVENTORS
Paul Schierse
Günter Franke
BY
Bailey, Stephens and Huettig
ATTORNEYS

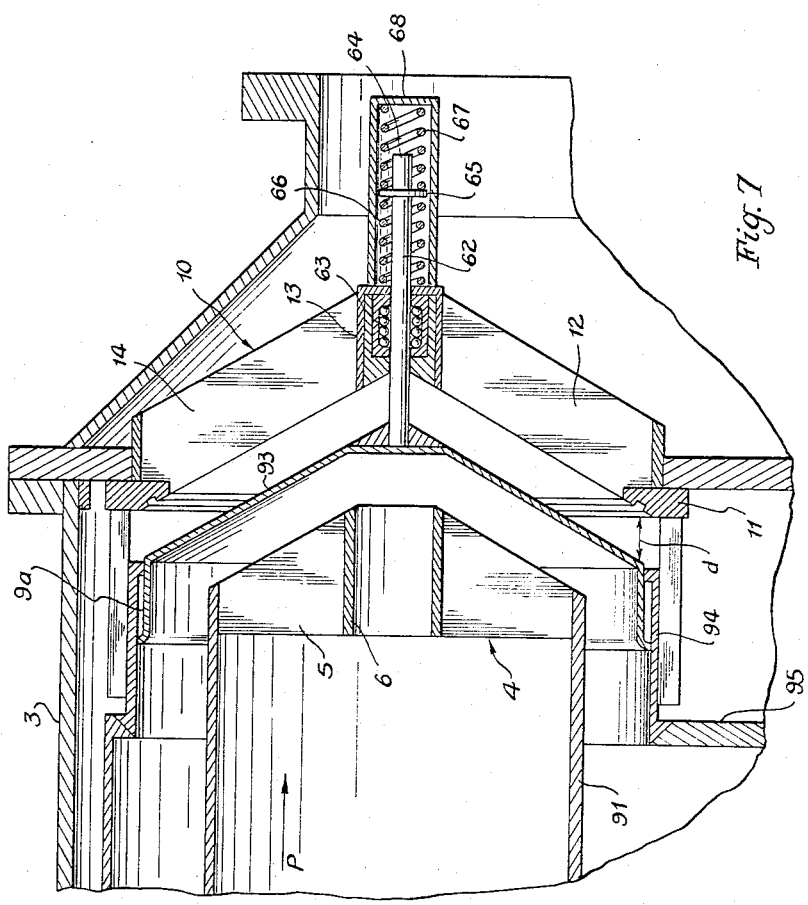

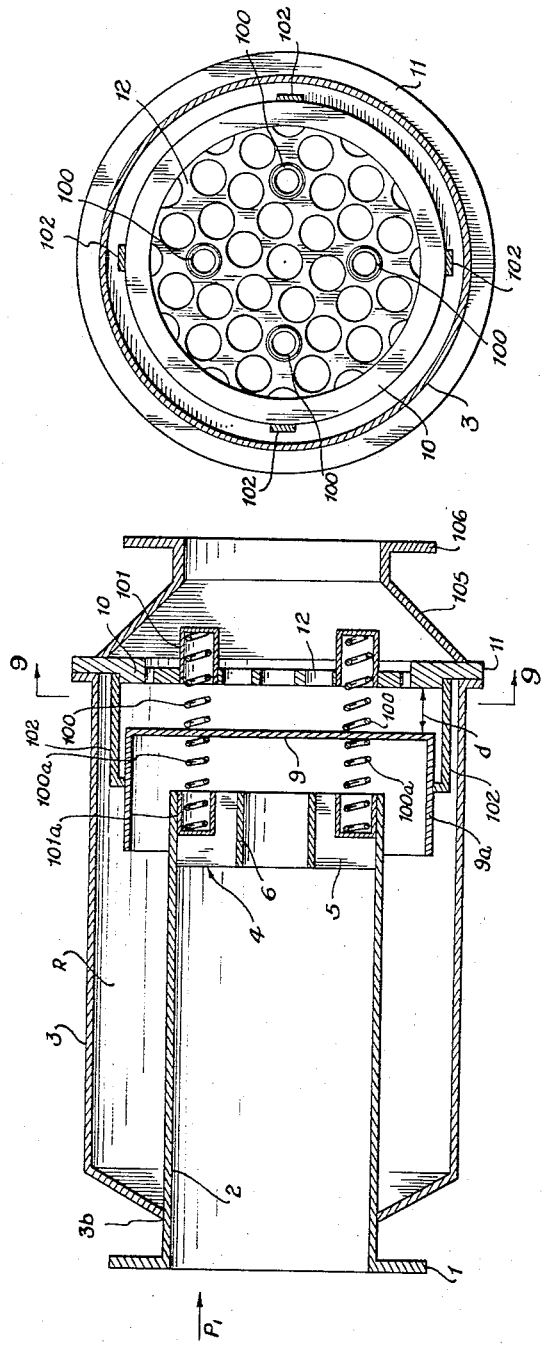

March 26, 1968  P. SCHIERSE ET AL  3,374,725
VALVE FOR AIR RAID SHELTERS
Original Filed Jan. 27, 1965  7 Sheets-Sheet 7
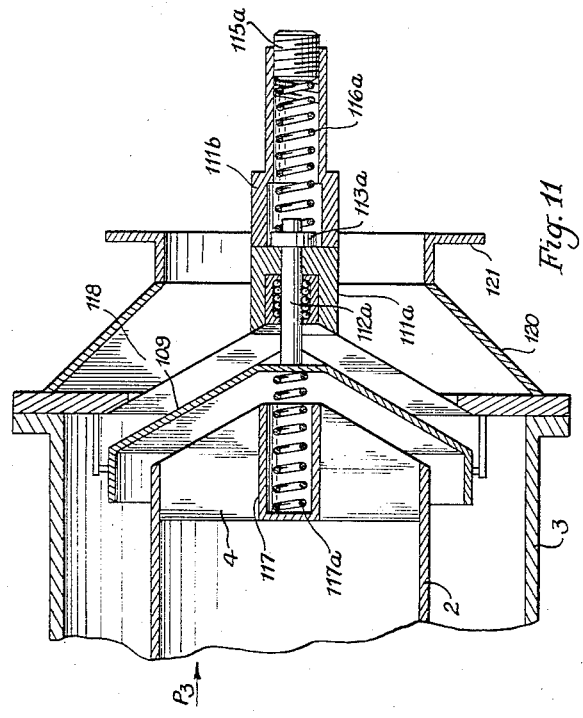
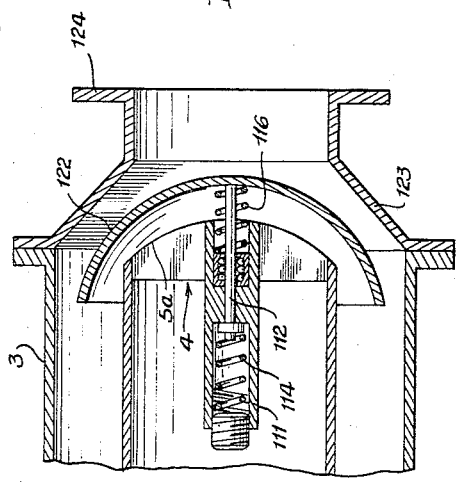
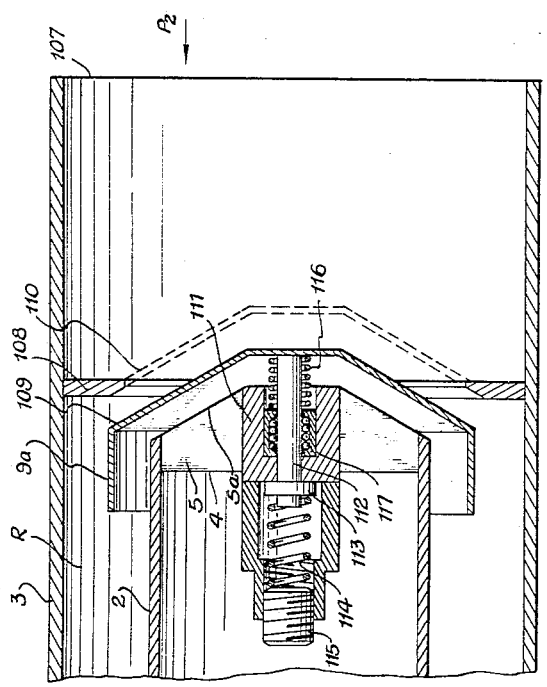
INVENTORS
Paul Schierse
Günter Franke
BY Bailey, Stephens and Huettig
ATTORNEYS United States Patent Office 3,374,725
Patented Mar. 26, 1968

3,374,725
VALVE FOR AIR RAID SHELTERS
Paul Schierse and Gunter Fianke, Lubeck, Germany, assignors to Ewers & Miesner Hartgusswerk und Maschinenfabrik G.m.b.H., Lubeck, Germany
Continuation of application Ser. No. 428,446, Jan. 27, 1965. This application Nov. 22, 1966, Ser. No. 596,345
Claims priority, application Germany, Jan. 31, 1964, E 23,316; July 11, 1964, E 27,387; Dec. 17, 1964, E 28,381
6 Claims. (Cl. 98—119)

ABSTRACT OF THE DISCLOSURE

An air intake or exhaust valve for an air raid shelter and which closes rapidly when subject to shock wave pressure is composed of a housing, a valve seat and a movable hollow piston valve head in the housing, and an air intake pipe which extends to within the skirt of the valve head. The skirt is of greater diameter than the intake pipe so that when the valve is closed by a shock wave the intake pipe communicates with the interior of the housing to deflect the shock wave. A spring holds the valve in normally open position.

---

This application is a continuation of application S.N. 428,446, filed Jan. 27, 1965, and now abandoned.

This invention relates to a valve for either the air intake or air exhaust duct of an air raid shelter.

In the copending application of Maassen, Ser. No. 332,055, filed Dec. 20, 1963, for "Valve for Air Raid Shelter," now Patent No. 3,232,208, there is disclosed a valve in which the valve head has a skirt for forming a hollow piston valve. The air intake pipe extends to within this hollow valve. The valve head is either curved or conical. The valve seat conforms to the shape of the valve head. This valve seat is constructed as a grate including a cylinder concentric with the longitudinal axis of the valve and struts extending from the cylinder to the wall of the valve housing. Other grate-like forms can be used including a perforated plate.

The length of the valve head and skirt is about ten times the length of the movement of the valve during opening and closing.

The intake pipe has its inlet end portion extending into the hollow piston valve reinforced by a grate composed of a cylinder joined by struts to the inner wall of the pipe. Again this grate-like structure can conform to the shape of the interior of the hollow piston valve so as to form a second valve seat when the valve is closed in an opposite direction.

The hollow piston valve and intake pipe are mounted within a housing. The air path between the valve seat and the opposite end of the housing is about twenty times longer than the distance the piston valve is moved during closing.

The object of this invention is to produce a further improvement upon the aforesaid disclosure. In this invention, the skirt of the valve head is not as long as heretofore, but in one instance is replaced by a cylindrical sleeve which is separate from the skirt and forms a stationary extension of this skirt. This reduces the mass that must be moved during the closing of the valve and has the advantage in reducing the time of closing because lower acceleration forces are involved.

In another form of the invention, the valve housing includes a plurality of hollow piston valves with corresponding valve seats. This has the advantage of using a plurality of small piston valves for the movement of a large volume of air rather than using a single massive piston valve. Accordingly, the closure time is again decreased. In this form of the invention, the path of the air pressure wave entering the valve is of such length that the movable valve parts close before being reached by the pressure wave.

In another form of the invention, the stationary skirt extension is substantially eliminated in order to produce a large hollow chamber between the intake pipe and the housing, this chamber being about ten to fifty times the distance the valve head moves in closing. This means that the skirt attached to the valve head can be materially shortened without running the risk that the pressure wave entering the valve can persist in the interior of the air raid shelter. The valve head can be flat, curved or conical. The valve seat is formed in the outlet end of the valve housing and the valve seat can be formed of reinforcing members as heretofore described.

In all forms of the invention, spring means are used to hold the valve in neutral open position so that the valve can be moved to close against an incoming pressure wave and then moved in the opposite direction to close against a following suction wave.

The means by which the objects of the invention are obtained are described more fully with reference to the accompanying drawings in which:

FIGURES 2 and 3 are similar views through modified forms of the invention;

FIGURE 4 is a cross-sectional view through a further modified form of the invention;

FIGURE 5 is a cross-sectional view taken on the line 5—5 of FIGURE 4;

FIGURE 6 is a cross-sectional view taken on the line 6—6 of FIGURE 4;

FIGURE 7 is an enlarged detail cross-sectional view of a portion of FIGURE 4;

FIGURE 8 is a longitudinal cross-sectional view through another modification of the invention;

FIGURE 9 is a cross-sectional view taken on the line 9—9 of FIGURE 8;

FIGURE 10 is a longitudinal cross-sectional view through still another modified form of the invention; and FIGURES 11 and 12 are similar views of two further modified forms of the invention.

Figure 1:
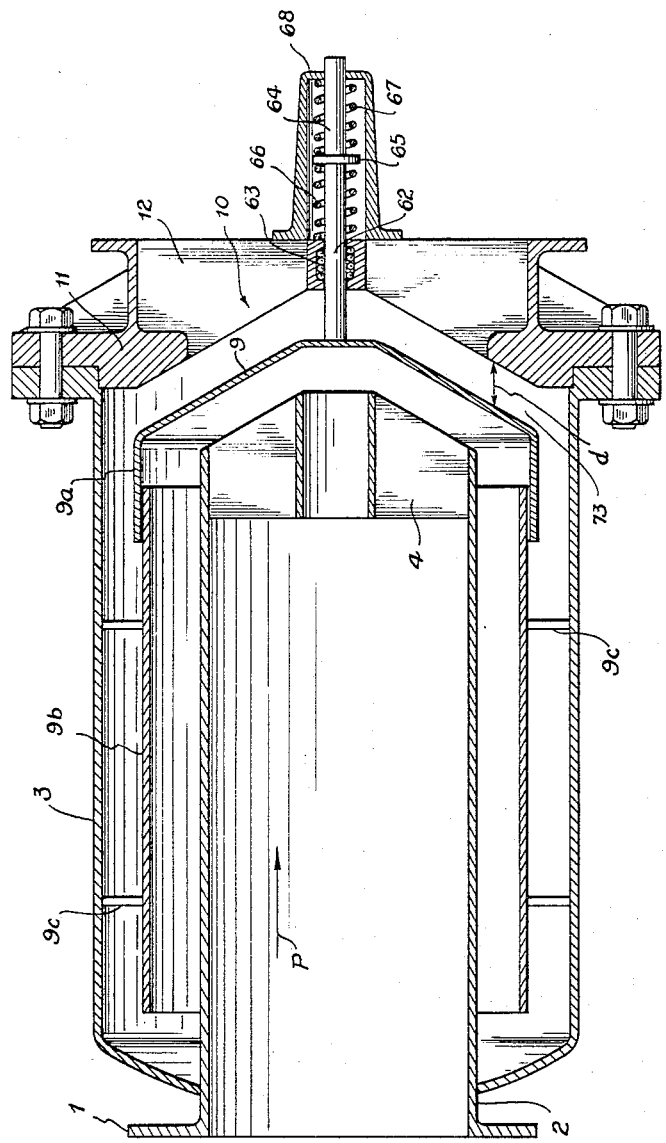
FIGURE 1 is a longitudinal cross-sectional view through the valve of this invention.

As shown in FIGURE 1, the flange 1 of an air intake pipe 2 is adapted to extend to the exterior side of an air raid shelter wall, with the valve housing 3 being attached to the pipe 2.

The free end of the air intake pipe 2 is reinforced by a grid 4 and extends into the interior of a hollow piston valve head 9 having a piston skirt 9a. The piston head can be elliptical, spherical, conical, or having any other configuration depending upon the requirements of the valve. In the air outlet end of housing 3 is a valve seat 10 which is composed of an annular rim 11 attached to housing 3 and a grate-like body 12 fastened to the rim.

The skirt 9a surrounds the end of a sleeve 9b which is secured to the housing by struts 9c. This sleeve is rather closely fitted within the skirt 9a and forms a separate stationary extension of the skirt. The length of the skirt 9a is at least equal to the lift or distance the valve head 9 moves when opened or closed.

Guiding means for the valve head 9 is provided by the valve stem 62 which can be formed as a hollow tube in order to reduce weight. Several symmetrically disposed stems can be used. This valve stem is journalled in a ball bearing 63 supported by the grate 12.

The valve stem 62 extends through ball bearing 63 with its end 64 lying beyond the interior surface of the shelter wall. A flange 65 on the stem 62 serves as an abutment for opposed springs 66 and 67 positioned on opposite sides of flange 65. The outermost spring 67 is held in place by a collar 68 on a fitting secured to the valve seat 10. Valve head 9 is held in neutral open position by springs 66 and 67.

When valve head 9 is moved in the direction of the arrow P, it becomes seated on valve seat 10. When moved in the opposite direction, the interior surface of valve head 9 becomes seated on the grate 4.

The distance $d$ is the length of the path the valve head moves during opening and closing.

The construction of FIGURE 1 has the advantage in that valve head 9 and stem 62 have a very low mass so that the valve is readily closed by low acceleration forces. Another advantage lies in that very little friction is created by the valve stem 62 mounted in the ball bearing. Therefore, the valve can close relatively rapidly. Another advantage lies in that, inasmuch as the sleeve 9b is stationary, no means needs to be provided for moving the same.

In FIGURE 2, the valve head is constructed as a first valve head 9 and a second valve head 70. The valve head 9 is of conical shape as shown in FIGURE 1, whereas the second valve head 70 is a flat plate. These valve heads are connected by a valve stem 71. This construction is of advantage when a flat valve head 70 and a flat valve seat are desired. Another advantage is in that the valve head and seat can be in the so-called ring slot form. In such form, valve head 70 has annular slots or other forms of openings, whereas the valve seat is solid opposite these openings. This means that when the valve is opened, passageways are formed not only both in the space between the periphery of the valve plate 70 and the valve seat, but also by the openings through the valve head 70. This makes it possible to lessen the resistance to movement of the second valve head 70 when the first valve head 9 is opened or closed and results in an increase in the speed of closing of the valve.

The stationary sleeve 9b has a closed end 74 surrounding the valve stem 71. Although this end 74 can be perforated, it is preferred that it be closed in order to resist a force which might be created inside of the chamber 76 and which would oppose the closing movement of valve head 9.

The valve stem 71 is journalled in a bearing as in FIGURE 1.

The second valve head 70 can be subdivided into several small valve heads with corresponding valve seats. This would mean that the area of the overall valve opening would be increased and would accommodate a greater flow of air.

In FIGURE 3, the structure of FIGURE 2 is further modified in that the first valve head 9 is spaced a greater distance from the second valve head 70. These valve heads are connected by a valve stem 71.

Valve head 9 has a skirt 77 so as to be a hollow piston valve and into which the air intake pipe 2 extends. The valve head 9 is surrounded by a closed member 74 which is the equivalent of the end 74 in FIGURE 2 and which protects valve head 9 against the effects of a pressure arising in chamber 80 opposing the closing of the valve head 9.

The distance approximately between the flange 1 and the valve seat 72 is about twenty times the lift $d$ of the second valve head 70. The length of the skirt 77 in FIGURE 3 is less than ten times the length of the distance $d$. As shown in the drawing, the length of skirt 77 is about three times the distance $d$. The valve stem 71 is journalled in a bearing as described for FIGURES 1 and 2.

The modification of FIGURE 3 has an advantage where the need arises for an installation of a relatively long valve housing. Another advantage is in that the diameter of the housing 3 is relatively small so that the strength of the corresponding parts can be correspondingly reduced.

In a further form of the invention, especially with regard to FIGURE 3, the valve stem 71 can be replaced by a mechanical linkage for connecting valve heads 9 and 70.

In the modification of FIGURES 4 to 7, the air intake end of the housing is at the flange 1, while the air outlet end 90 of the housing extends into the interior of the air raid shelter and is adapted to be connected to a filter or the like.

A plurality of intake pipes 91 extend within the housing, four being shown for purposes of illustration. These pipes divide the inlet opening 92 into four air passageways so that the total cross-sectional area of the pipes 91 corresponds approximately to the cross-section of the entrance opening 92.

The end of each pipe 91 within the housing is reinforced by a grate 4 which includes radially extending struts 5 joined to a centrally positioned cylinder 6. Each grate is concentric with the longitudinal axis of its respective intake pipe.

Each pipe 91 extends within the interior of a hollow piston valve head 93 of any suitable shape having a skirt 9a.

As described for FIGURES 1 to 3, the valve seat 10 is similarly shaped and conforms to the surface of the valve head.

Each skirt 9a is surrounded by a separate stationary skirt 94, which stationary skirts are secured to a plate 95 having corresponding openings. This plate, in turn, is extended into a cylinder 96 which surrounds all of the pipes 91 and thus forms an extended stationary skirt common to all the pipes 91. The center of plate 95 is joined to a rod 97 which extends to the inlet end of the housing 3 and is fastened by a suitable means to the housing. Each valve head 93 has a valve stem 62 similar to that described for FIGURE 1.

When the valve head 93 moves in the direction of the arrow P, it becomes seated on valve seat 10. During the movement of the valve head 93 in the opposite direction, it becomes seated on the grate 4 mounted in the end of intake pipe 91.

When an explosion occurs in the outside atmosphere, the pressure wave passes through intake pipes 91 and strikes each of the valve heads 93 where it is deflected. The pressure wave moves within the space surrounded by the cylinder 96 and the housing 3 and thus to the valve opening. In this construction, the length of the spaces through which the pressure wave moves amounts to about forty times the closing distance $d$ for each valve head. In actual practice, this distance $d$ is less than illustrated in the drawings because the suction produced from within the air raid shelter draws the valve head toward the valve seat. In this modification, the path over which the pressure wave has to travel is substantially lengthened and during the time of travel of the pressure wave the valve head 93 has sufficient time to become seated upon the valve seat 10.

If, after the occurrence of a pressure wave, a suction or vacuum may exist outside of the air raid shelter, the valve head 93 moves in the opposite direction and becomes seated upon the grate 4. Consequently, the air raid shelter is protected from loss of air.

In a further form of this modification, the plurality of intake pipes 91 can be replaced by a single intake pipe which is provided with a plurality of valve heads 93.

In a further form of this modification, the plate 95 can be joined to a plurality of cylinders 96, each of which is concentric with the housing to form a plurality of spaces between the pipes 91 and the housing 3.

In the modification of FIGURES 8 to 12, the air intake pipe 2 extends within the housing 3 as in the preceding forms of the invention and has a grate 4 reinforcing the end of the intake pipe extending to within the piston valve. However, this grate has a flat end to conform with the flat valve head of the piston valve and thus forming a valve seat for the valve head. The valve head has the same cylindrical valve skirt 9a which has a length ordinarily approximately equal to the closure distance for the valve head as applied against the grate 4. However, the length of the skirt can be shortened so as to be completely eliminated or made longer than the closing distance in order to obtain the optimum length determined by the requirements of the valve. The valve head 9 can have any suitable shape. In the direction of the interior of the air raid shelter is a valve seat 10 mounted on the end of the housing 3. This valve seat is composed of a solid circular body 11 having perforations 12. This valve seat is flat to conform with the flat valve head 9. As such, valve seat 10 forms a relatively large supporting surface for the valve head 9.

Springs 100 abut the outer surface of valve head 9 and have their other ends held in sockets 101 secured to the valve seat 10. In the interior of the piston valve are further springs 100a abutting the inner surface of the valve head 9 and having their opposite ends held in sockets 101a secured to the grate 4. These springs serve to hold the valve head 9 in neutral open position and to center the valve head in the housing. The size of the sockets is such that they are able to contain entirely the springs 100 and 100a, respectively, when the valve head is closed either upon the valve seat 10 or the grate 4.

Guide struts 102 are secured to the valve seat 10 and extend to be in sliding engagement with the skirt 9a so as to guide the valve head during the opening and closing of the valve.

Valve seat 10 is directly secured to housing 3. The distance between the intake end 3b of the housing and valve seat 10 is approximately ten to fifty times that of the valve closing distance d. A chamber R is formed between the intake pipe 2 and the housing 3 and extending from inlet end 3b of the housing to valve seat 10.

The outlet end of the housing is joined to a fitting 105 terminating in a flange 106.

This valve is designed so that the primary pressure it is exposed to can be in the direction of arrow $P_1$ or in the opposite direction.

In FIGURE 10, the valve is modified in that the housing 3 has its end 107 extended beyond the valve seat 108 which is inserted in the housing 3. A dished valve head 109 is adapted to be seated on an open gridwork 110, which may also be constructed of struts or a perforated sheet. The end of the intake pipe extending within the valve head 109 contains the grate 4, the outer ends 5a of which form a valve seat for the inner wall of the valve head 109. Mounted in the center of grid 4 is a guide block 111 into which extends the valve stem 112. A flange 113 on the valve stem provides an abutment for a spring 114 which also bears against an adjustable plug 115 threaded into block 111. On the other side of flange 113, a spring 116 is inserted into a bore in block 111. Thus springs 114 and 116 serve to hold the valve head 109 in neutral open position. In FIGURE 10, the primary pressure wave is assumed to be in the direction of the arrow $P_2$.

In FIGURE 11, a dished valve head 109 is also used. The grate 4 is shown substantially as shown in FIGURE 1. As such, it supports a socket body 117 containing a spring 117a which bears against the inner surface of the valve head 109. A valve stem 112a extends from the outer surface of valve head 109 through a bearing block 111a and has a flange 113a. The bearing block 111a is extended by a spring housing 111b which contains a spring 116a held in place by a threaded plug 115a. Again the springs 116a and 117a serve to hold the valve head 109 in neutral open position. The bearing block 111a is mounted in a valve seat 118 composed of a grid or struts. This valve seat is a part of a body 120 which is secured to the end of the housing 3 and terminates in a flange 121. The primary pressure wave is assumed to be in the direction of the arrow $P_3$.

In the modification of FIGURE 12, the dished valve head 122 is semi-spherical. Accordingly, the surface edges 5a of the struts 5 also form a semi-spherical surface to conform with the inner side of the valve head and act as a valve seat. The spring assembly for holding the valve head in neutral open position is substantially the same as shown in FIGURE 10.

The secondary housing 123 is attached to the end of housing 3 and is conically shaped to serve as another valve seat for the valve head 122. Secondary housing 123 terminates in a flange 124.

Having now described the means by which the objects of the invention are obtained:

We claim:

1. In a valve for either the air intake or the air exhaust duct of an air raid shelter comprising a housing, a hollow piston valve head movably mounted in said housing and having a skirt directed to the air inlet end of said housing, said valve head having a diameter greater than its length, air intake pipe means mounted in said housing coaxial with said skirt and spaced from said housing for directing intake air against said piston valve head and over the edge of said skirt into the space between said pipe means and said housing and through the outlet end of said housing, reinforcing means in said pipe means composed of at least one cylindrical member and struts joining said member to said pipe means, and spring means for holding said valve head in normally open position and yieldable under shock wave pressure to close said valve head on the outlet end of said housing.

2. In a valve as in claim 1, further comprising guide means for said valve head supported by said reinforcing means.

3. In a valve as in claim 2, said guide means comprising a valve stem joined to said valve head and journaled in said reinforcing means.

4. In a valve as in claim 3, said valve seat means comprising reinforcing means forming a valve seat for said valve head.

5. In a valve as in claim 4, further comprising a valve stem joined to said valve head, and valve stem guide means supported by said reinforcing means.

6. In a valve as in claim 1, further comprising a stationary sleeve concentric with said intake pipe extending within said skirt and spaced between said air intake pipe and said housing and terminating short of the air intake end of said housing for forming a shock wave deflecting passageway from the interior of said air intake pipe, through the space between said air intake pipe and said sleeve, and then into the space between said sleeve and said housing.

References Cited

UNITED STATES PATENTS 3,140,648    7/1964    Bergman et al. _____ 98—119
3,232,208    2/1966    Maassen _____ 98—119

EDWARD J. MICHAEL, *Primary Examiner.*

ROBERT A. O'LEARY, *Examiner.*

M. A. ANTONAKAS, *Assistant Examiner.*